Jan. 13, 1970   L. C. PHILLIPS   3,489,025
BELT TAKE-UP MECHANISM

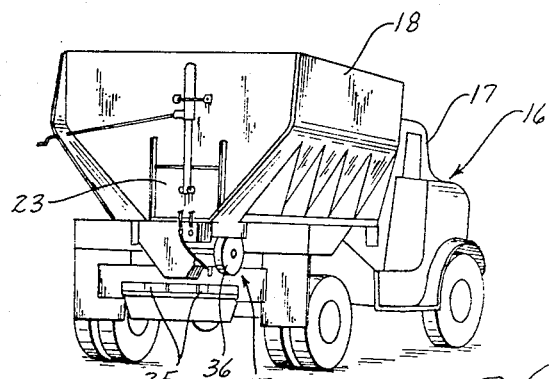
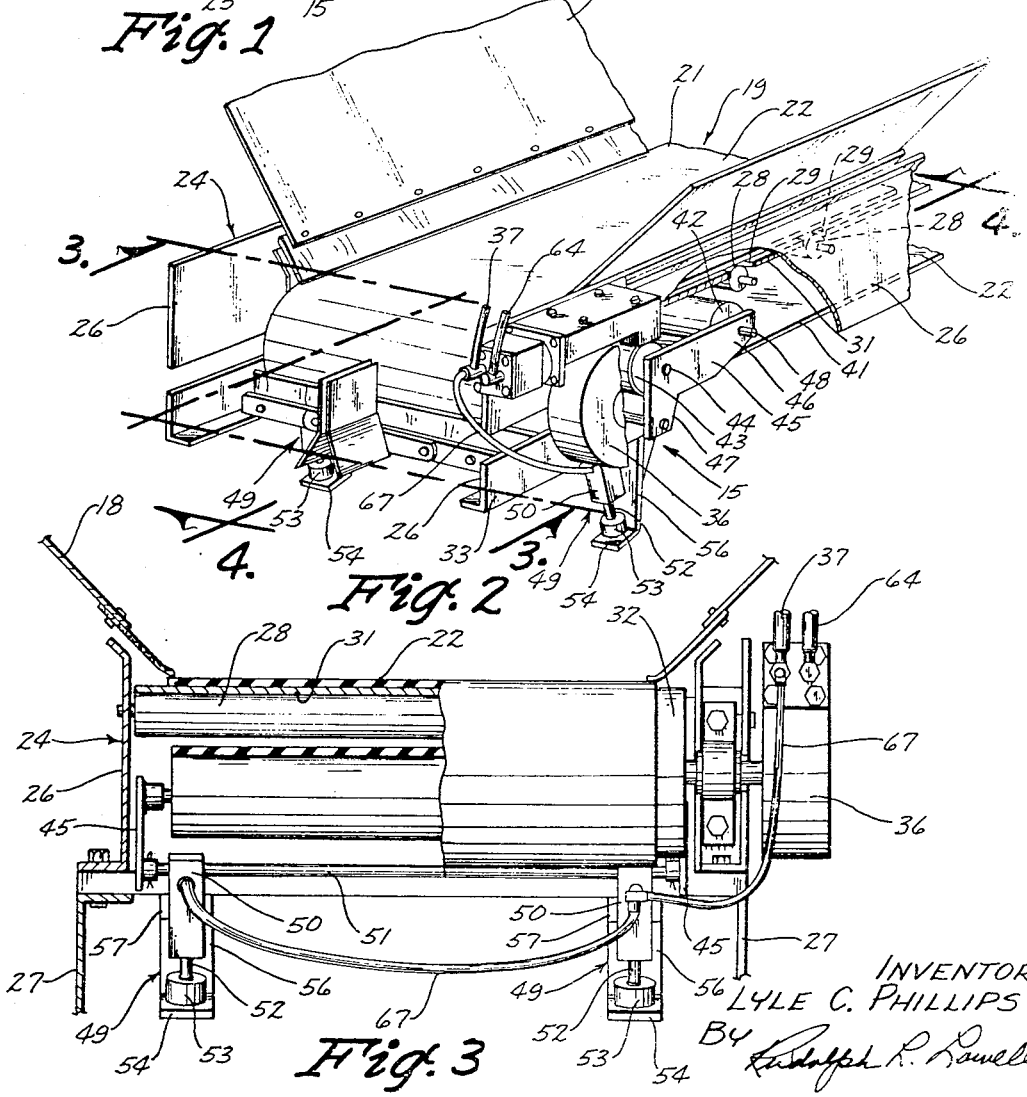
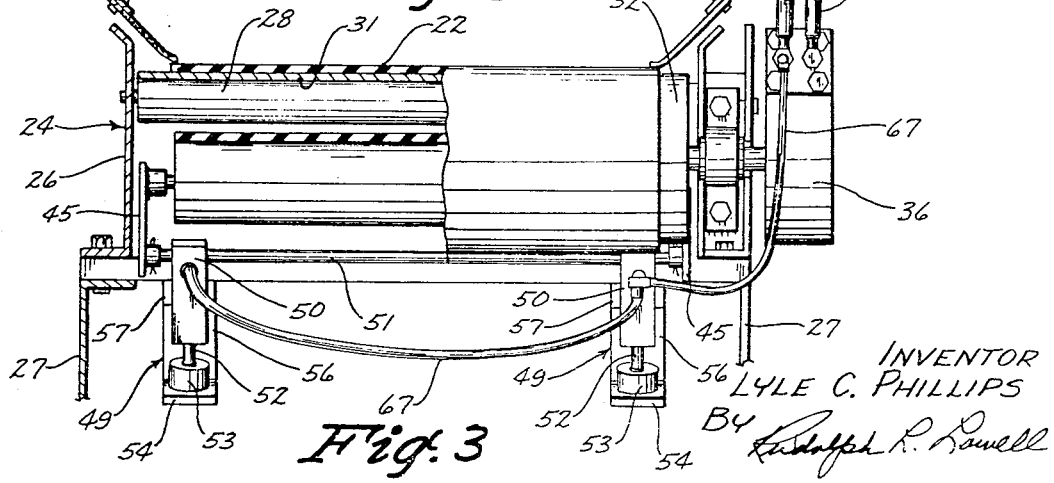

Filed Sept. 4, 1968   2 Sheets-Sheet 2

INVENTOR
LYLE C. PHILLIPS
BY
ATTORNEY

United States Patent Office 3,489,025
Patented Jan. 13, 1970

3,489,025
BELT TAKE-UP MECHANISM
Lyle C. Phillips, Cedar Rapids, Iowa, assignor to Henderson Manufacturing Co., Manchester, Iowa, a corporation of Iowa
Filed Sept. 4, 1968, Ser. No. 757,349
Int. Cl. F16h 7/08
U.S. Cl. 74—242.9                          5 Claims

ABSTRACT OF THE DISCLOSURE

The belt take-up mechanism is intended for use in the unloading of material from a wagon or truck box wherein a flat endless conveyor belt has a top run extended longitudinally along the bottom of the box to support the material for discharge through an adjustable outlet at one end of the box. The mechanism is located adjacent the outlet and includes a hydraulically operated drive roller, an idler roller spaced inwardly from the drive roller, and a belt take-up roller located between the drive and idler rollers, with the bottom run of the belt trained over the take up roller. The take-up roller is rotatably supported on brackets that are pivotally movable about the axis of the idler roller so that the take-up roller is pivoted in an up and down direction between the drive and idler rollers. A pair of hydraulic one-way acting cylinder assemblies spaced axially of the take-up roller have one of their ends pivoted on the supporting brackets and their opposite ends fixed at positions below the take-up roller. The fluid supply line to a hydraulic motor for the drive roller has a feed line connecting the cylinder assemblies in series. The cylinder assemblies are thus concurrently retracted and extended in direct response to the decrease and increase of the fluid pressure in the motor supply line. The increase in fluid pressure provides for an upward pivoted movement of the take-up roller to automatically take up any slack in the belt in direct response to the load applied on the drive roller by the upper run of the belt.

SUMMARY OF THE INVENTION

The invention provides a belt take-up mechanism which is of a simple and compact construction, capable of being readily installed on existing equipment, and efficient in operation to continuously maintain the belt in frictional engagement with its drive roller. Where material in transport is carried on the belt, it tends to become compacted so as to effect a heavy starting load on the belt and in turn on the belt drive motor. As a result, on starting of the conveyor belt, the resultant tension force, set up in its upper run, tends to stretch the belt so as to leave a slack condition of the belt about a portion of the drive roller to effect belt slippage. By virtue of the application of the motor supply fluid to the belt take-up roller, such belt slack is automatically taken up concurrently with the belt being maintained in frictional engagement with the drive roller so that maximum power is transmitted to the drive roller under maximum load conditions. The belt take-up mechanism thus acts to eliminate belt slack concurrently with maintaining a desired belt tension under all conditions of belt load.

DETAILED DESCRIPTION OF THE INVENTION

Further objects, features, and advantages of the invention will become apparent from the following description when taken in connection with the accompanying drawing wherein;

FIG. 1 is a rear end perspective view of a belt conveyor unloading truck which includes the belt take-up mechanism of this invention;

FIG. 2 is an enlarged perspective view showing the assembly of the belt take-up mechanism with the conveyor belt of the truck shown in FIG. 1, with some parts broken away and other parts shown in section to more clearly show such assembly;

FIG. 3 is an enlarged sectional view taken along the line 3—3 in FIG. 2;

Figure 4:
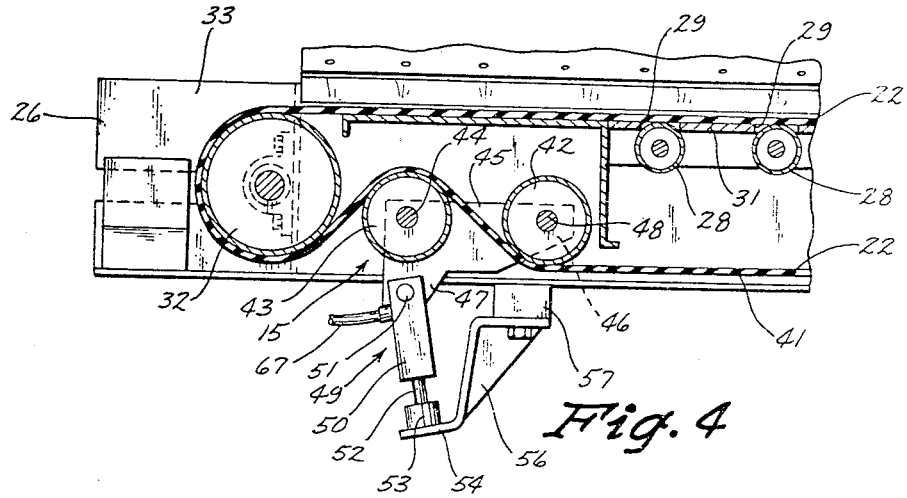
FIG. 4 is a sectional view as seen on line 4—4 in FIG. 2.

With reference to the drawing, the belt take-up mechanism, indicated generally as 15 in FIGS. 1 and 2, is shown in assembly relation with a truck 16 for spreading material such as salt, chemical fertilizers or the like. The truck includes the usual cab 17 and a flare type box 18 having an endless belt unloading conveyor 19 extended longitudinally thereof such that the top run 21 of the conveyor belt 22 forms the bottom wall of the box 18, as best appears in FIG. 2. Material from the belt 22 is discharged from the box through an adjustable end gate opening 23 (FIG. 1) onto a pair of horizontally rotatable fans 25 which broadcast or disperse the material over the ground.

The unloading conveyor 19 includes an inverted channel shaped frame 24 (FIG. 3) having flange or side members 26 that are mounted on beam members 27 that form part of the truck frame. A series of transverse rollers 28 (FIGS. 2 and 4) spaced longitudinally of the channel frame 24 are rotatably supported in the side flanges 26 with their top sides projected through corresponding transverse openings 29 formed in the web 31 of the channel frame 24 so as to lie in the plane of the top surface of the web 31.

The side flanges 26 project outwardly from the opposite ends of the channel frame 24. A drive roller 32 (FIG. 4) is rotatably supported in the rearwardly projected end sections 33 of the side flanges 26 and a front supporting roller 34 for the belt 22 is supported in the forwardly extended sections 35 (FIG. 3) of the side flanges 26. The top sides of the rollers 32 and 34 lie in a plane common to the top surface of the web 31.

It is seen, therefore, that the belt 22 travels over the transverse rollers 28 and web 31 and about the drive roller 32 and front roller 34. The drive roller 32 is operatively associated in a driven relation with a hydraulic motor 36 (FIG. 2) fluid to which is supplied under pressure through a supply line 37 from a pump unit provided on the truck 16 and driven from the truck engine in a usual manner. Initial tension in the belt 22 is adjusted in a conventional manner by tension devices 38 having slide blocks or bearings 39 (FIG. 5) for the front roller 34 carried in the side flanges 26 for adjustment longitudinally of the channel frame 24 by adjusting screws 40.

With the material in the box 18 supported directly on the top run 21 of the belt 22, an initial heavy starting load is applied on the motor 36 due to the high tension force set up in the top belt run 22 as a result of the pulling action thereon by the drive roller 32. This tension force is of a magnitude to produce a stretching in the top run 21 between the front roller 34 and the drive roller 32, especially should the load of material become compacted during transport from a truck loading station.

Under some conditions of operation, this stretch in the top run 21 may be on the order of about a half an inch or more and tends to accumulate as slack in the bottom belt run 41 (FIG. 4) at the belt run off side of the drive roller 32. This results in a reduction of the belt area that is in frictional engagement with the drive roller 32 and a decrease of the tension in the belt bottom run 41 whereby belt slippage occurs about the drive roller. The starting of an unloading operation is thus not only inefficient, but results in excessive wear on the belt 22. This disadvantage is overcome by the belt take-up mechanism 15 of this invention.

This mechanism includes an idler roller 42 (FIGS. 2 and 4) rotatably supported in the side flanges 26 at a position spaced inwardly or forwardly from the drive roller 32 with its lower side engageable with the bottom belt run 41. A belt take-up roller 43 is arranged between the drive roller 32 and the idler roller 42 with its top side engageable with the bottom run 41. The shaft 44 of the take-up roller 43 has the ends thereof rotatably supported in a pair of levers 45, each of which is of a generally L-shape and arranged adjacent the inner surface of a corresponding side flange 26. The long leg section 46 of a lever 45 extends longitudinally of the channel frame 24, with the short leg 47 thereof projected downwardly. With the shaft 44 carried adjacent the rear end of the long leg section 46, at a position above the depending short leg 47, the front end of the leg section 46 is rotatably supported about the shaft 48 of the idler roller 42 to provide for an up and down pivotal movement of the take-up roller 43.

As best shown in FIG. 4 the take-up roller 43 and idler roller 42 are of substantially the same size, and smaller than the drive roller 32. It will be further noted that the axis of the take-up roller 43 is located substantially equi-distant between the axes for the idler roller 42 and drive roller 32.

The levers 45 are pivotally moved by a pair of hydraulic cylinder assemblies 49 each of which is located inwardly of and adjacent to a lever 45. The closed ends of the cylinders 50 of the cylinder assemblies 49 are mounted on a transverse rod 51, the ends of which are rotatably supported in the free ends of which are rotatably supported in the free ends of the short leg sections 47 of the levers 45. The piston rods 52 corresponding to the cylinders 50 have their free or outer ends receivable in sockets 53 that are rigidly mounted on corresponding rearwardly extended legs 54 that form part of supporting brackets 56 for the cylinder assemblies 49. The brackets 56 are attached in a depending relation from a transverse member 57 that is mounted on and extends between the truck frame beam members 27. On the supply of fluid under pressure to the cylinder assemblies 49, the cylinders 49 are extended and retracted relative to their associated piston rods 52.

Figure 6:
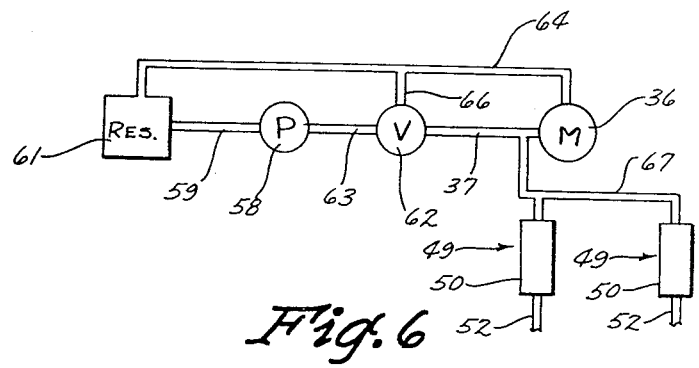
FIG. 6 is a schematic showing of the hydraulic system for the operating motor of the drive roller and for the hydraulic cylinders of the belt take-up mechanism.

As shown schematically in FIG. 6 the hydraulic system for the motor 34 and cylinder assemblies 49 includes the truck engine operated pump unit 58 that has an inlet line 59 connected to an oil reservoir 61. A control valve 62 interconnects the pump outlet line 63 with the supply line 37 to the motor 36 which has an exhaust line 64 connected to the reservoir 61. A bypass line 66 interconnects the valve 62 with the exhaust line 64. The cylinder assemblies 49 are series connected in the feed line 67 that is connected directly to the supply line 37 for the motor 36. Thus on opening of the control valve 62, fluid under the same pressure is supplied to the motor 36 and to the cylinder assemblies 49 for a purpose to appear later.

Figure 5:
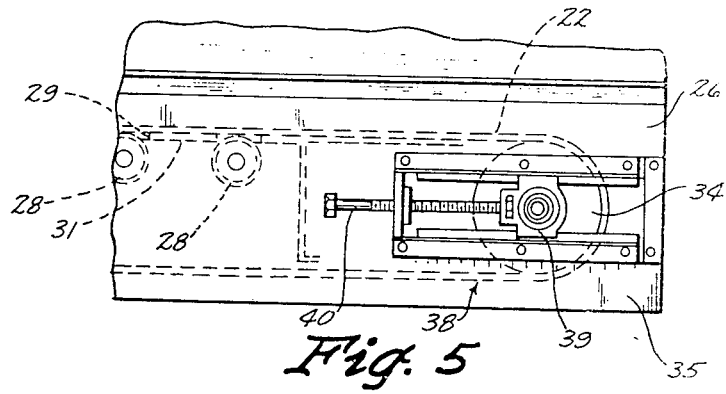
FIG. 5 is an elevational view of the front end of the belt conveyor showing a usual initial belt tensioning device in assembly relation therewith.

In the use of the belt take-up mechanism 15, and with the cylinder assemblies 49 in their retracted positions shown in FIG. 4, the initial tension in the belt 22 is adjusted by the tensioning devices 38 at the front roller 34 (FIG. 5). In the retracted positions of the cylinder assemblies 49 (FIG. 4), the axis of the take-up roller 43 is in a horizontal plane common to the axis of the idler roller 42, and with this common plane being below a horizontal plane extended through the axis of the drive roller 32.

On opening of the control valve 62 (FIG. 6) oil under the same pressure is concurrently supplied to the motor 36 and to the hydraulic cylinder assemblies 49. This pressure in the motor supply line 37 and in the feed line 67 for the cylinder assemblies 49 will undergo the same variations in response to the load applied on the drive roller 32 by the top belt run 21. Thus with an increase in the tension force effected in the top run 21, and tending to stretch such top run, there is a corresponding increase in the pressure of fluid supplied to the motor 36 and cylinder assemblies 49. By virtue of this pressure increase, the hydraulic cylinder assemblies 49 are extended to pivotally move the belt take-up roller 43 upwardly, as viewed in FIG. 4. Such upward movement of the rollers 43 automatically takes up any resultant slack occurring in the bottom run 41 at the belt run-off portion of the drive roller 32.

Along with taking up such slack, the belt take-up roller 43 maintains substantially constant the area of the belt 22 that is in frictional engagement with the rollers 32, 42, and 43. Thus along with automatically taking up belt slack in direct response to the load conditions applied on the motor 36 by the drive roller 32, the take-up roller 43 functions to maintain the bottom belt run 41 under its initial tension as set by the tensioning devices 38. Belt slippage, therefore, is substantially eliminated by the automatic action of the belt take-up roller 43 to control belt slack in direct response to the power supply requirements called for by the motor 36 to handle the load conditions on the top belt run 21.

In one embodiment of the invention having a top belt run 21 about ten feet long and eighteen inches wide the drive roller 32 and the front roller 34 were of nine inch diameters and the idler roller 42 and take-up roller 43 of five inch diameters. With the cylinder assemblies 49 retracted, as shown in FIG. 4, the axes of the rollers 42 and 43 were located in a common plane which is about one and one-half inches below the axis of the drive roller 32 and the axis of the take-up roller 43 was located approximately eight inches from the axis of the idler roller 42 and about eight and one-half inches from the axis of the drive roller 32.

The hydraulic motor 36 in this embodiment was rated with a twelve gallon per minute flow at 1200 r.p.m. and the cylinder assemblies 49 had a stroke of about seven-eighths of an inch. With about a ten ton load in the truck box 18, the starting pressure of the oil in the motor supply line 37 was about two thousand (2,000) pounds per square inch. For this starting condition, the top run 21 of the belt 22 stretched about a half an inch. After the conveyor 19 was started, oil pressure in the motor supply line dropped down to a running pressure of about one thousand (1,000) pounds per square inch. During this variation in the oil pressure supply, the belt take-up mechanism 15 operated to automatically compensate the slack variations in the belt 22 and to maintain the belt in a non-slipping relation with the drive roller 32 and front roller 34 concurrently with maintaining the initially adjusted tension in the bottom belt run 41.

I claim:
1. A belt take-up mechanism for an endless belt conveyor having a top load-conveying run, a bottom run and a drive roller at one of the ends of said runs driven by a motor having a power supply line, comprising:
   (a) an idler roller spaced inwardly from the drive roller having a lower portion engageable with the bottom run,
   (b) a belt take-up roller located between the drive roller and the idler roller having a top portion engageable with the bottom run,
   (c) means pivotally supporting said take-up roller for up and down pivotal movement about the axis of said idler roller,

(d) linearly extendible and retractable power means connected with said supporting means to pivotally move said take-up roller, and (e) a feed line from said power supply line connected to said power means so that the power supplied to said power means to pivotally move said take-up roller varies directly with the power supplied to said motor means whereby the belt take-up in said bottom run is automatically varied in response to the belt load imposed on the motor by the top run of the belt.

2. The belt take-up mechanism for an endless belt conveyor according to claim 1 wherein:

(a) said idler roller and belt take-up roller, when said power means is retracted, have the axes thereof in a common horizontal plane located below a horizontal plane extended through the axis of said drive roller.

3. The belt take-up mechanism for an endless belt conveyor according to claim 2 wherein:

(a) said idler roller and take-up roller are of a substantially equal diameter, which is less than the diameter of said drive roller, and the axis of said take-up roller is located substantially equi-distant between the axes of said idler roller and drive roller.

4. A belt take-up mechanism for an endless belt conveyor having a top load-conveying run, a bottom run and a drive roller at one of the ends of said runs driven by a hydraulic motor having a fluid pressure supply line, comprising:

(a) an idler roller spaced inwardly from the drive roller having a lower portion engageable with the bottom run, (b) a belt take-up roller located between the drive roller and idler roller having an upper portion engageable with the bottom run, (c) means pivotally supporting said belt take-up roller for pivotal up and down movement about the axis of said idler roller between a first position wherein the lower portion thereof is in a plane tangent to the lower portion of the idler roller to a second position wherein the lower portion of the take-up roller is located upwardly from said tangent plane, (d) said drive roller being of a greater diameter than said take-up roller with the lower portion thereof located below said tangent plane, (e) a hydraulic cylinder assembly having an extensible and retractable member connected to said supporting means, said member on extension thereof pivotally moving said take-up roller from the first position to the second position therefor, and (f) a feed line connected to said supply line and to said hydraulic cylinder assembly, whereby said take-up roller is pivotally moved upwardly from the first position toward the second position therefor to automatically take up the slack in the belt bottom run in direct response to the load applied on the belt top run.

5. The belt take-up mechanism for an endless belt conveyor according to claim 4, wherein:

(a) said take-up roller has the axis thereof located substantially equi-distant from the axes of said idler roller and drive roller.

References Cited

UNITED STATES PATENTS

| | | | |
|---|---|---|---|
| 1,383,850 | 5/1921 | Pitts | 74—242.11 |
| 2,610,517 | 9/1952 | Hornbostel | 74—242.11 |

FOREIGN PATENTS

| | | |
|---|---|---|
| 25,123 | 6/1936 | Australia. |

FRED C. MATTERN, Jr., Primary Examiner

J. A. WONG, Assistant Examiner

U.S. Cl. X.R.

74—242.11